US010987988B2

(12) United States Patent
Garcia et al.

(10) Patent No.: US 10,987,988 B2
(45) Date of Patent: Apr. 27, 2021

(54) DAMPER WITH VOLUME REDUCING INSERT (71) Applicant: Tenneco Automotive Operating Company Inc., Lake Forest, IL (US)

(72) Inventors: Iñaki Garcia, Algorta (ES); Veronica Diez, Bilbao (ES); Yves Pivot, Tongeren (BE)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 57 days.

(21) Appl. No.: 16/009,592

(22) Filed: Jun. 15, 2018

(65) Prior Publication Data
US 2019/0001783 A1    Jan. 3, 2019

Related U.S. Application Data (60) Provisional application No. 62/526,090, filed on Jun. 28, 2017.

(51) Int. Cl.
*B60G 17/08* (2006.01)
*F16F 9/18* (2006.01)
*B60G 13/08* (2006.01)

(52) U.S. Cl.
CPC .............. *B60G 17/08* (2013.01); *B60G 13/08* (2013.01); *F16F 9/18* (2013.01); *B60G 2202/24* (2013.01);
(Continued)

(58) Field of Classification Search
CPC ................ B60G 17/08; B60G 2202/24; B60G 2500/114; B60G 13/08; B60G 2500/106; F16F 9/18; F16F 2230/0058
See application file for complete search history.

(56) References Cited

U.S. PATENT DOCUMENTS

| 2,324,058 A | 7/1943 | Boor |
| 2,357,920 A | 9/1944 | Whisler, Jr. |

(Continued)

FOREIGN PATENT DOCUMENTS

| DE | 3822970 A1 | 1/1990 |
| EP | 0261427 A2 | 3/1988 |

(Continued)

OTHER PUBLICATIONS

Written Opinion in related PCT Application No. PCT/US2018/039708 dated Oct. 19, 2018.

(Continued)

*Primary Examiner* — Vishal R Sahni
(74) *Attorney, Agent, or Firm* — Harness, Dickey & Pierce, P.L.C.

(57) ABSTRACT

A shock absorber including a pressure tube, a piston assembly slidably disposed within the pressure tube, and a fluid transfer tube that extends about the pressure tube is provided. The piston assembly divides an inner volume of the pressure tube into first and second working chambers. An intermediate chamber between the pressure tube and the fluid transfer tube is arranged in fluid communication with the first working chamber. A valve assembly is disposed in fluid communication with the intermediate chamber and the second working chamber. The valve assembly controls fluid flow between the intermediate chamber and the second working chamber. At least part of the intermediate chamber is formed by a fluid transfer channel that extends longitudinally within the fluid transfer tube to provide a fluid flow path extending between the first working chamber and the valve assembly.

10 Claims, 12 Drawing Sheets

(52) U.S. Cl.
CPC .. *B60G 2500/106* (2013.01); *B60G 2500/114* (2013.01); *F16F 2230/0058* (2013.01)

(56) References Cited

U.S. PATENT DOCUMENTS

| | | | |
|---|---|---|---|
| 2,432,937 A | 12/1947 | Rossman | |
| 2,717,669 A | 9/1955 | Stock | |
| 3,225,870 A | 12/1965 | Heckethorn | |
| 3,302,756 A | 2/1967 | McIntyre | |
| 3,329,241 A | 7/1967 | Palmer | |
| 3,722,639 A | 3/1973 | Keijzer et al. | |
| 3,904,002 A | 9/1975 | Adrian et al. | |
| 3,945,474 A | 3/1976 | Palmer | |
| 4,044,865 A | 8/1977 | Tourunen | |
| 4,445,598 A | 5/1984 | Brambilla | |
| 4,971,180 A | 11/1990 | Kobayashi et al. | |
| 5,000,299 A | 3/1991 | Goto et al. | |
| 5,070,970 A * | 12/1991 | Johnston | F16F 9/3482 188/315 |
| 5,113,980 A | 5/1992 | Furrer et al. | |
| 5,353,897 A | 10/1994 | Woessner | |
| 5,353,898 A * | 10/1994 | Handke | F16F 9/325 188/318 |
| 5,449,055 A | 9/1995 | Geiling et al. | |
| 5,487,455 A * | 1/1996 | Feigel | F16F 9/46 137/487.5 |
| 5,522,486 A * | 6/1996 | Fulks | F16F 9/34 188/286 |
| 5,598,904 A | 2/1997 | Spyche, Jr. | |
| 5,738,191 A | 4/1998 | Forster | |
| 5,924,528 A | 7/1999 | Vermolen et al. | |
| 6,283,259 B1 | 9/2001 | Nakadate | |
| 6,321,888 B1 * | 11/2001 | Reybrouck | F16F 9/325 188/299.1 |
| 6,443,271 B2 | 9/2002 | Schmidt | |
| 6,913,127 B2 | 7/2005 | Holiviers et al. | |
| 7,347,307 B2 | 3/2008 | Joly | |
| 8,434,772 B2 * | 5/2013 | Keil | F16F 9/3235 188/315 |
| 8,616,351 B2 | 12/2013 | Roessle et al. | |
| 9,217,483 B2 | 12/2015 | Dunaway et al. | |
| 9,291,229 B2 | 3/2016 | Shibahara | |
| 9,303,711 B2 * | 4/2016 | Nakajima | F16F 9/325 |
| 9,388,877 B2 | 7/2016 | Konakai et al. | |
| 9,404,551 B2 | 8/2016 | Roessle et al. | |
| 9,441,698 B2 * | 9/2016 | Suzuki | F16F 9/066 |
| 9,551,395 B2 * | 1/2017 | Fujihara | F16F 13/007 |
| 9,662,952 B2 | 5/2017 | Funke et al. | |
| 9,739,330 B2 | 8/2017 | Reybrouck et al. | |
| 9,879,746 B2 | 1/2018 | Keil et al. | |
| 10,054,182 B2 | 8/2018 | Roessle et al. | |
| 2003/0019701 A1 * | 1/2003 | Hodgson | F16F 9/0472 188/298 |
| 2005/0056504 A1 | 3/2005 | Holiviers | |
| 2005/0061593 A1 | 3/2005 | DeGronckel et al. | |
| 2005/0067240 A1 | 3/2005 | Holiviers et al. | |
| 2007/0221459 A1 * | 9/2007 | Kobelev | F16F 9/3235 188/322.19 |
| 2007/0278028 A1 | 12/2007 | Fought et al. | |
| 2009/0120749 A1 * | 5/2009 | Kolz | F16F 9/185 188/322.19 |
| 2009/0242339 A1 * | 10/2009 | Nakadate | F16F 9/464 188/266.5 |
| 2014/0090941 A1 * | 4/2014 | Shibahara | F16F 9/18 188/315 |
| 2014/0238797 A1 | 8/2014 | Blankenship et al. | |
| 2014/0262652 A1 | 9/2014 | Roessle et al. | |
| 2015/0101900 A1 * | 4/2015 | Kitamura | B60G 13/08 188/314 |
| 2015/0152935 A1 * | 6/2015 | Ogawa | F16F 9/516 188/313 |
| 2016/0017950 A1 * | 1/2016 | Nakano | F16F 9/187 188/315 |
| 2016/0059656 A1 | 3/2016 | Funke et al. | |
| 2016/0082803 A1 | 3/2016 | Dunaway et al. | |
| 2016/0089950 A1 * | 3/2016 | Yamaguchi | F16F 9/46 188/266.2 |
| 2017/0299009 A1 | 10/2017 | Murakami et al. | |
| 2018/0172105 A1 | 6/2018 | Roessle et al. | |
| 2019/0186581 A1 | 6/2019 | Roessle et al. | |
| 2019/0351724 A1 | 11/2019 | Roessle et al. | |

FOREIGN PATENT DOCUMENTS

| | | |
|---|---|---|
| GB | 1583278 A | 1/1981 |
| JP | 2002257179 A | 9/2002 |
| JP | 201100247371 A | 12/2011 |
| JP | 2016061314 A | 4/2016 |
| KR | 20100089490 A | 8/2010 |
| WO | 2016067733 A1 | 5/2016 |
| WO | 2018112375 A1 | 6/2018 |

OTHER PUBLICATIONS

International Search Report in related PCT application No. PCT/US2018/039708 dated Oct. 19, 2018.

International Search Report and Written Opinion issued in PCT/US2020/016789, dated Jun. 4, 2020.

\* cited by examiner

DAMPER WITH VOLUME REDUCING INSERT

CROSS-REFERENCE TO RELATED APPLICATIONS

This application claims the benefit of U.S. Provisional Application No. 62/526,090, filed on Jun. 28, 2017. The entire disclosure of the above application is incorporated herein by reference.

FIELD

The present disclosure relates to a hydraulic damper or shock absorber adapted for use in a suspension system such as the suspension systems used for automotive vehicles. More particularly, the present invention relates to an insert for a shock absorber that decreases the volume of an intermediate chamber in the shock absorber.

BACKGROUND

This section provides background information related to the present disclosure and is not necessarily prior art.

Shock absorbers are used in connection with automobile suspension systems and other vehicle suspension systems to absorb unwanted vibrations, which occur during locomotion. To absorb unwanted vibration, shock absorbers are generally connected between the body and the suspension of the automobile. A piston is located within the shock absorber and is connected to the vehicle body through a piston rod. The piston creates two working chambers inside the shock absorber that are filled with a damping fluid. The piston has passageways and valve disk stacks that limit the flow of damping fluid between the two working chambers of the shock absorber when the shock absorber undergoes compression and extension. As a result, the shock absorber is able to produce a damping force that counteracts suspension movements and vibration which could otherwise be transmitted from the suspension of the automobile to the body.

In a semi-active shock absorber, the amount of damping force generated during compression and extension movements of the shock absorber is controlled by using an electromechanical valve that selectively modifies a secondary passageway between the two working chambers of the shock absorber. During use, high frequency piston accelerations can cause pressure resonances. Pressure waves created in the secondary passageway by high frequency piston accelerations can cause clatter noises that are objectionable to drivers and occupants of the vehicle. As a result, there remains a need for shock absorbers that produce less clatter noise during high frequency suspension movements.

SUMMARY

This section provides a general summary of the disclosure, and is not a comprehensive disclosure of its full scope or all of its features.

The present disclosure provides for a shock absorber that includes a pressure tube, a piston assembly slidably disposed within the pressure tube, and a fluid transfer tube that extends about the pressure tube. The pressure tube extends about a longitudinal axis and defines an inner volume therein. The piston assembly is attached to a piston rod and divides the inner volume of the pressure tube into first and second working chambers. An intermediate chamber is defined between the pressure tube and the fluid transfer tube. The intermediate chamber is arranged in fluid communication with the first working chamber. A valve assembly is disposed in fluid communication with the intermediate chamber and the second working chamber. When the shock absorber undergoes compression and extension movements, the valve assembly controls fluid flow between the intermediate chamber and the second working chamber. At least part of the intermediate chamber is formed by a fluid transfer channel that extends longitudinally within the fluid transfer tube to provide a fluid flow path extending between the first working chamber and the valve assembly. Advantageously, the smaller volume of the fluid transfer channel reduces the formation of pressure waves inside the intermediate chamber. Because pressure waves inside the intermediate chamber can create undesirable resonances and clatter, the subject design reduces the noise, vibration, and harshness of the shock absorber.

Other advantages and objects of the present disclosure will become apparent to those skilled in the art from the subsequent detailed description, appended claims and drawings. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

The entire disclosure of International Application No. PCT/US2017/066735, filed on Dec. 15, 2017 is incorporated herein by reference. Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items. The terms "abuts" and "abutting" as used herein means that one element is positioned in direct contact with or in close proximity to another element.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "inside," "outside," "internal," "external," "beneath," "below," "lower," "above," "upper," and the like, may be used herein for ease of description to describe one element or feature's relationship to another element(s) or feature(s) as illustrated in the figures. The terms "outer," "outside," and "external" do not necessarily require the element to be on the outside of the shock absorber. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIGS. 1-10, an exemplary shock absorber 10 is shown. In this example, the shock absorber 10 includes a pressure tube 1, a fluid transfer tube 2, a valve assembly 3, a piston 4, a piston rod 5, and a reserve tube 14. In the illustrated embodiments, the pressure tube 1 is the inner-most tubular member of the shock absorber 10. The pressure tube 1 includes a first pressure tube end 21, a second pressure tube end 23, an internal surface 25, and an external surface 27. The pressure tube 1 extends about a longitudinal axis 38 and defines an inner volume 11. The piston 4 is slidably disposed within the pressure tube 1. The inner volume 11 of the pressure tube 1 is separated into a first working chamber 12 and a second working chamber 13 by piston 4. The first and second working chambers 12, 13 are filled with/contain a damping fluid. As can be appreciated, the flow of the damping fluid is limited by the piston 4 as well as by optional piston passageways 17 and piston valve disk stacks 19 when the shock absorber 10 undergoes compression and extension. A primary fluid flow path for communicating fluid between the first and second working chambers 12, 13 is defined by the piston passageways 17 and/or the space between the piston 4 and the wall of the pressure tube 1. Due to this fluid flow, the shock absorber 10 is able to dampen vibrations that are imparted on the suspension of a vehicle.

Figure 1:
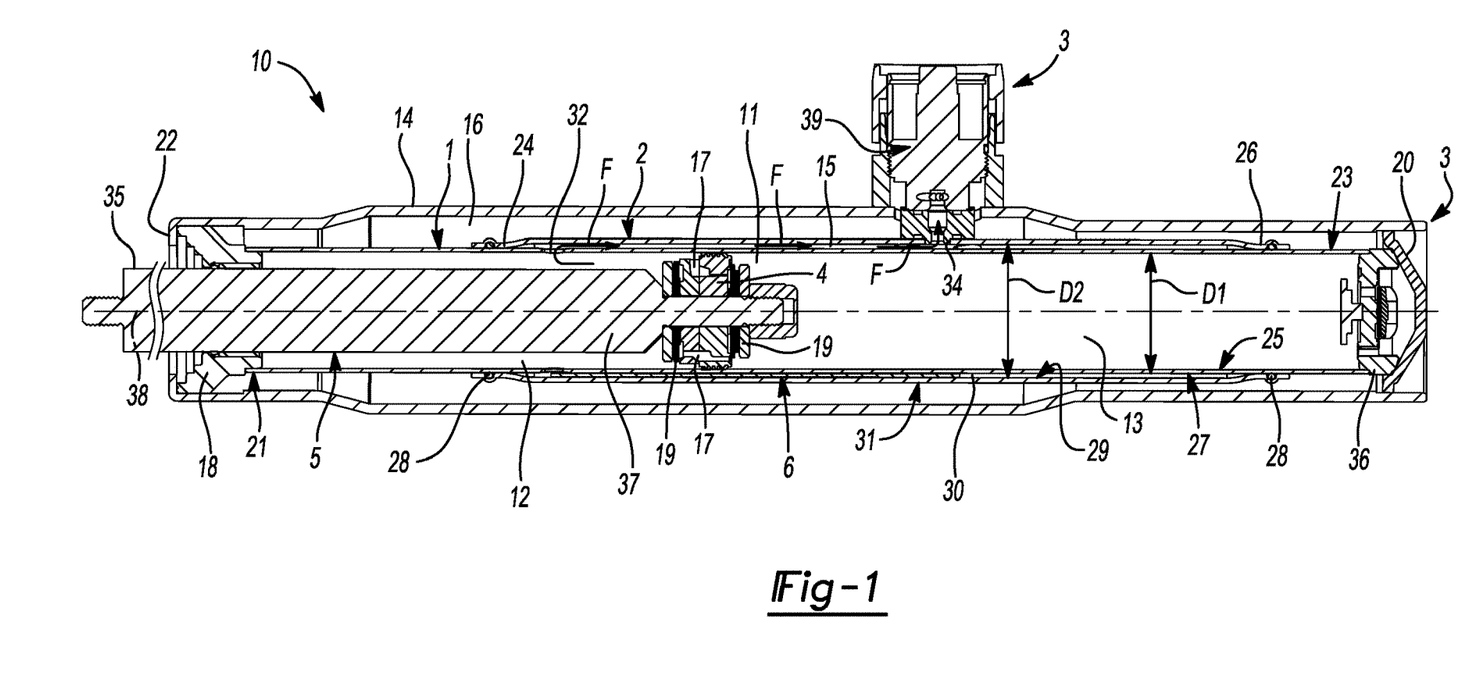
FIG. 1 is a cross-sectional side view of an exemplary shock absorber constructed in accordance with the present disclosure.
Figure 2:
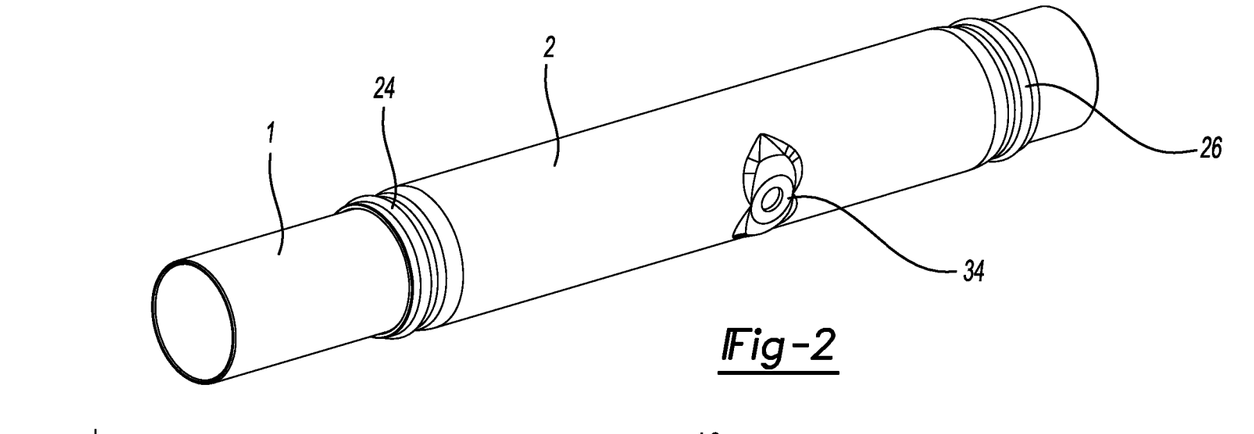
FIG. 2 is a perspective view of an exemplary pressure tube and fluid transfer tube assembly constructed in accordance with the present disclosure.
Figure 3:
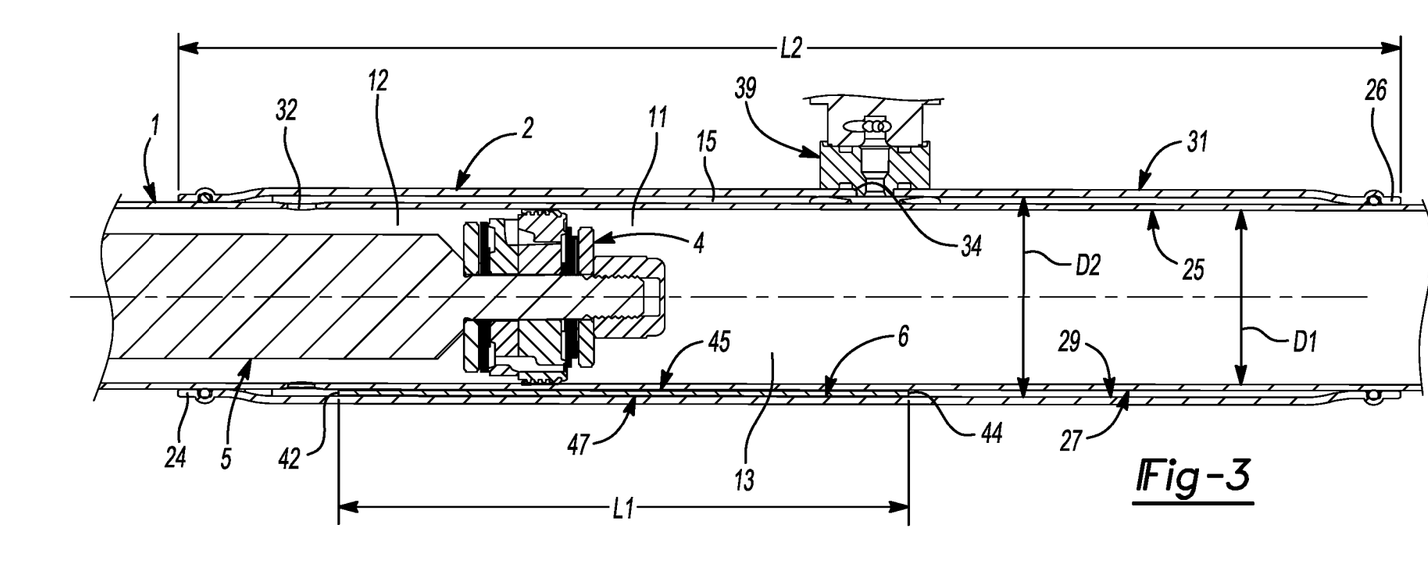
FIG. 3 is a cross-sectional side view of the exemplary assembly shown in FIG. 2.
Figure 4:
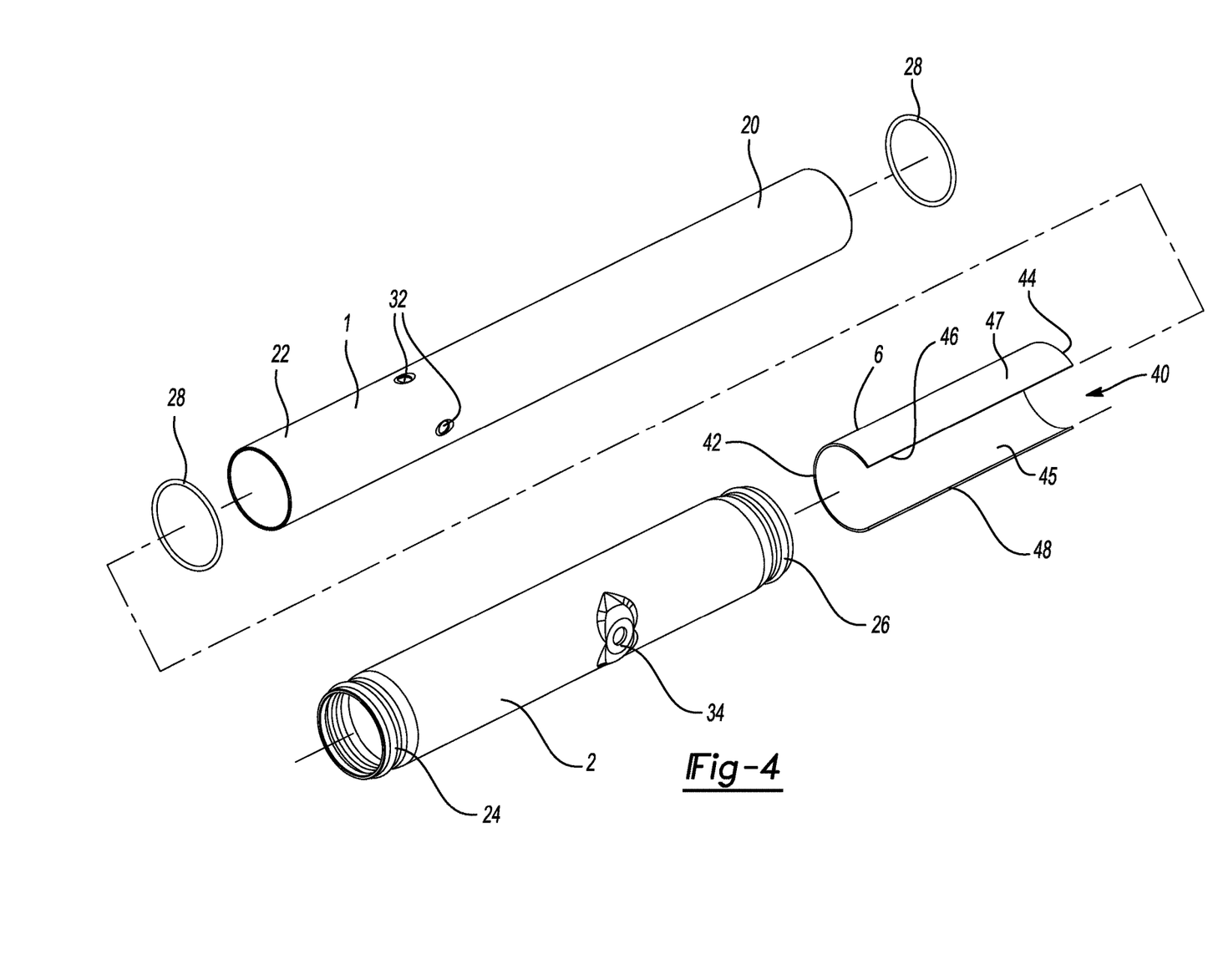
FIG. 4 is an exploded perspective view of the exemplary assembly shown in FIG. 2.
Figure 5:
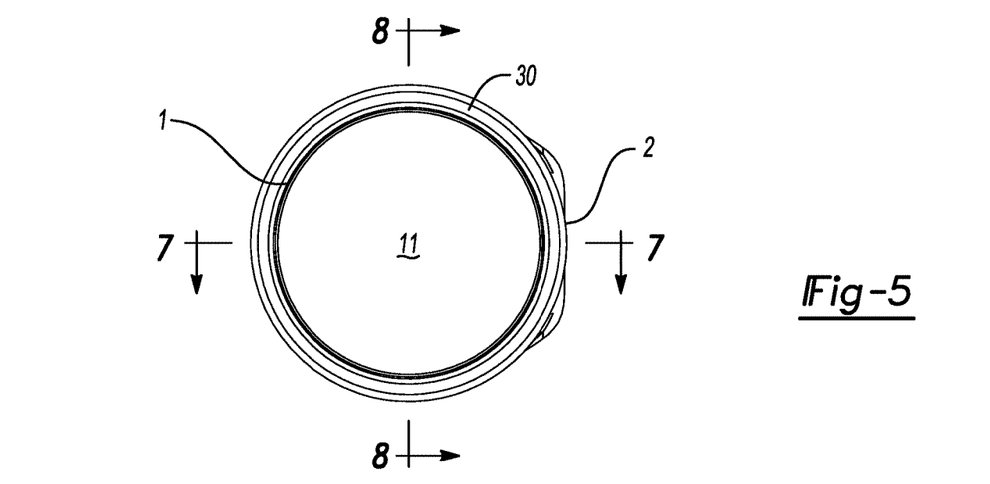
FIG. 5 is an end view of the exemplary assembly shown in FIG. 2.
Figure 6:
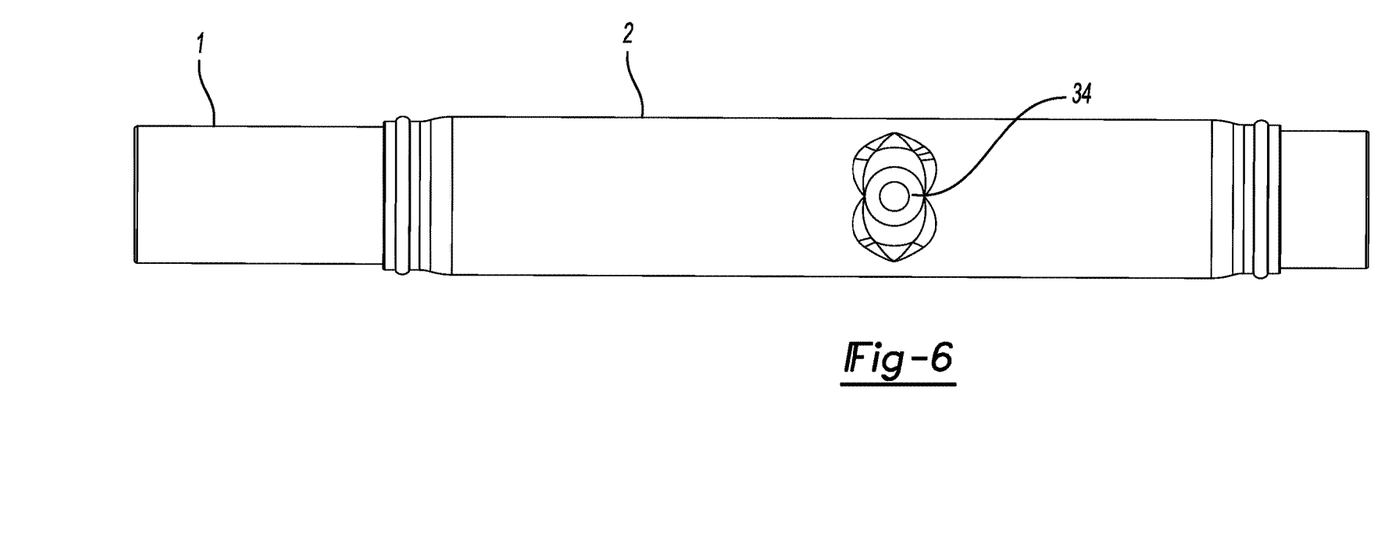
FIG. 6 is a side view of the exemplary assembly shown in FIG. 2.
Figure 7:
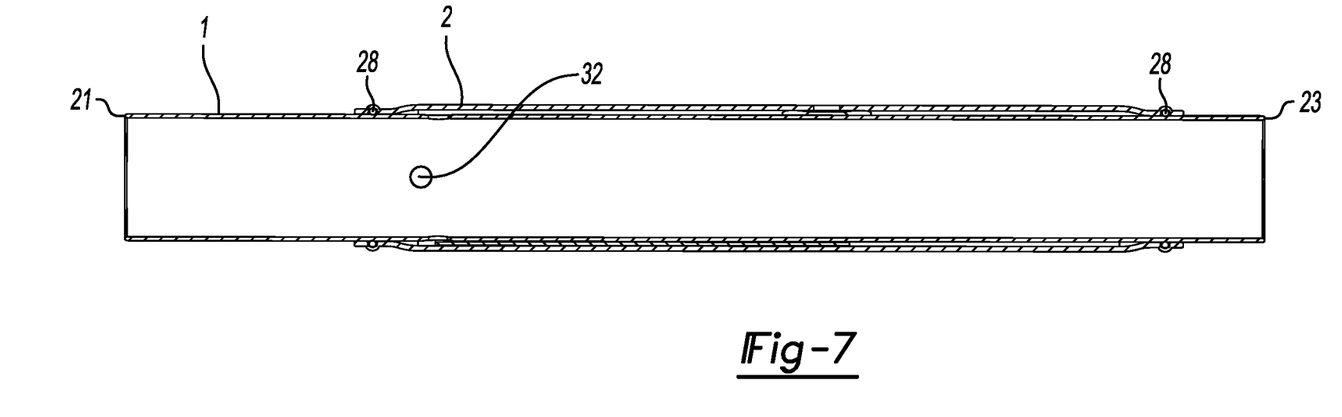
FIG. 7 is a cross-sectional top view of the exemplary assembly shown in FIG. 2 taken along line 7-7 in FIG. 5.
Figure 8:
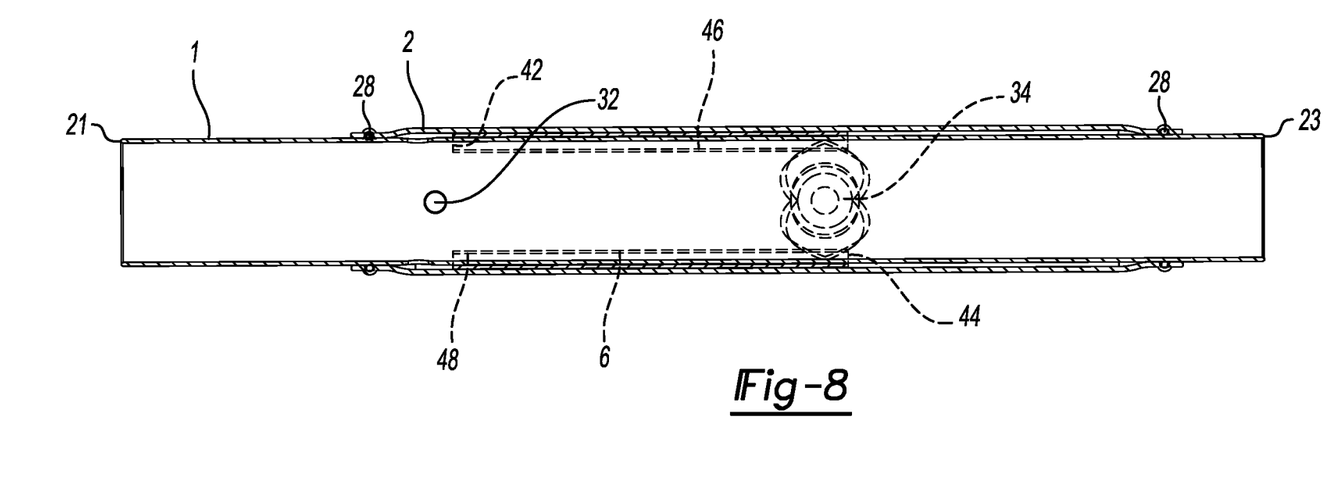
FIG. 8 is a cross-sectional side view of the exemplary assembly shown in FIG. 2 taken along line 8-8 in FIG. 5.
Figure 9:
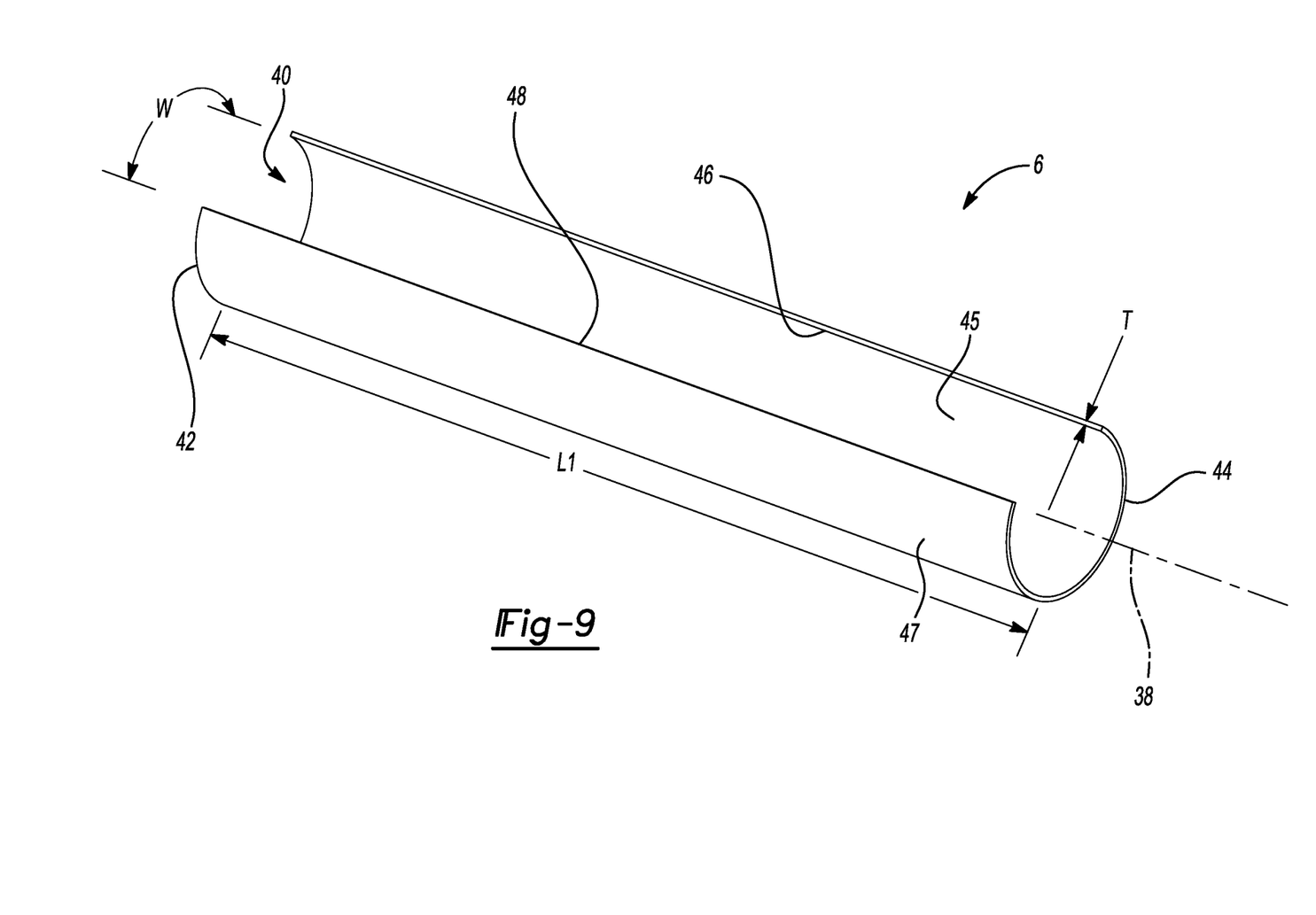
FIG. 9 is a perspective view of an exemplary insert constructed in accordance with the present disclosure.
Figure 10:
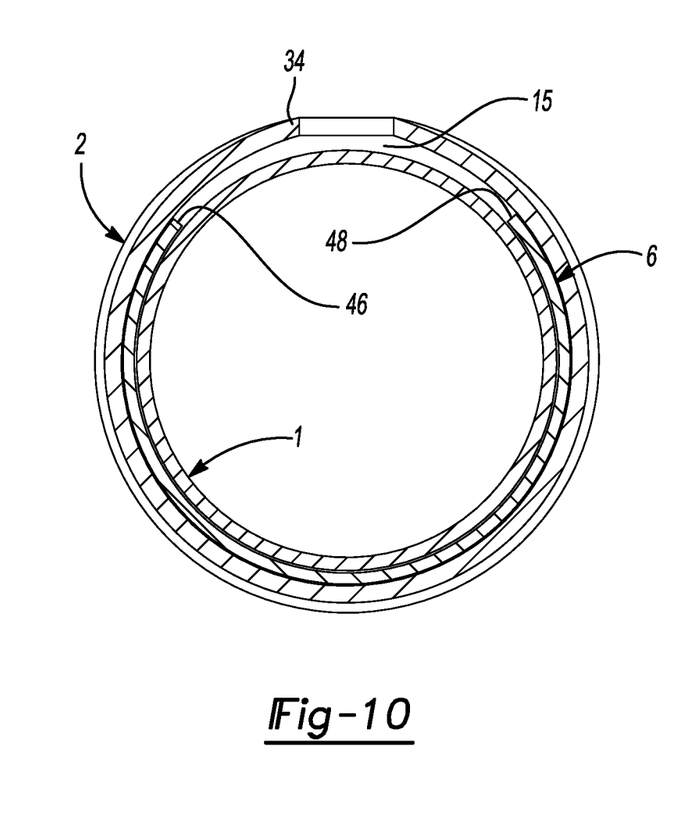
FIG. 10 is a cross-sectional end view of the exemplary assembly shown in FIG. 2.

In the illustrated embodiments, the reserve tube 14 is the outer-most tubular member of the shock absorber 10. The reserve tube 14 extends annularly about the pressure tube 1. The reserve tube 14 includes a first reserve tube end 22 and a second reserve tube end 20. The first reserve tube end 22 is connected to the first pressure tube end 21 by a rod guide 18 and the second reserve tube end 20 is connected to the second pressure tube end 23 by base valve 36. Accordingly, the space enclosed by the reserve tube 14 defines a reservoir chamber 16. The rod guide 18 supports the piston rod 5 and allows the piston rod 5 to slide longitudinally relative to the reserve tube 14 during compression and extension movements of the shock absorber 10.

The piston rod 5 includes a first piston rod end 35 and a second piston rod end 37. The first piston rod end 35 is configured to be connected to the suspension of the vehicle and the second piston rod end 37 is connected to the piston 4. The base valve 36 positioned at the second reserve tube end 20 controls fluid flow between the reservoir chamber 16 and the second working chamber 13. The second reserve tube end 20 may also include other features (not shown) to connect the shock absorber 10 to the opposing side of the suspension system or, in the alternative, to the body of the vehicle. As can be appreciated, the first reserve tube end 22 and the second reserve tube end 20 can also be connected in other orientations and to other components of the vehicle.

The fluid transfer tube 2 is positioned radially between the pressure tube 1 and the reserve tube 14. The fluid transfer tube 2 includes a piston end 24, a valve end 26, an inside surface 29, and an outside surface 31. In the illustrated examples, the fluid transfer tube 2 has an inner diameter D2 that is larger than an outer diameter D1 of pressure tube 1 such that an intermediate chamber 30 is created between the fluid transfer tube 2 and the pressure tube 1. In the illustrated embodiments, the fluid transfer tube 2 is tapered at the piston end 24 and at the valve end 26 and is connected to pressure tube 1 to enclose the intermediate chamber 30 around the pressure tube 1. In other words, at least part of the fluid transfer tube 2 is spaced radially outward of the pressure tube 1 and at least part of the reserve tube 14 is spaced radially outward of the fluid transfer tube 2. The external surface 27 of the pressure tube 1 faces the inside surface 29 of the fluid transfer tube 2 and the intermediate chamber 30 is positioned in the space between the external surface 27 of the pressure tube 1 and the inside surface 29 of the fluid transfer tube 2. The outside surface 31 of the fluid transfer tube 2 faces the reserve tube 14 and the reservoir chamber 16 is positioned in the space between the outside surface 31 of the fluid transfer tube 2 and the reserve tube 14.

As shown on FIG. 1, seals 28 such as an elastomeric O-rings may optionally be provided between the fluid transfer tube 2 and the pressure tube 1 at the piston end 24 and/or the valve end 26 to fluidly seal the intermediate chamber 30. As indicated by the arrows F in FIG. 1, the damping fluid is able to flow from the first working chamber 12 to the intermediate chamber 30 through at least one outlet 32 that extends through the pressure tube 1. In the illustrated examples, the outlet 32 is a round opening in the pressure tube 1 that is positioned adjacent to the piston end 24 of the fluid transfer tube 2. Upon entering the intermediate chamber 30, the damping fluid flows through a fluid transfer channel 15 that extends longitudinally within the fluid transfer tube 2. The fluid transfer channel 15 defines a fluid flow path that extends linearly from the outlet 32 of the first working chamber 12 to the valve assembly 3 in a direction that is parallel to the longitudinal axis 38.

The valve assembly 3 is connected to the fluid transfer tube 2 at a valve connection point 34 positioned on the valve end 26 of the fluid transfer tube 2. The valve assembly 3 is fluidly connected to the intermediate chamber 30 and the second working chamber 13. In the illustrated example, the valve assembly 3 includes the base valve 36 and a reservoir valve 39. However, it should be appreciated that other configurations are possible. By way of non-limiting example, the valve assembly 3 could be configured to include only the base valve 36 or only the reservoir valve 39.

In the illustrated examples, the reservoir valve 39 is positioned in fluid communication with and controls fluid flow between the intermediate chamber 30 and the reservoir chamber 16. In this manner, the first working chamber 12 is fluidly connected to reservoir chamber 16 via the fluid transfer channel 15 and the reservoir valve 39. The base valve 36 is positioned in fluid communication with and controls fluid flow between the reservoir chamber 16 and the second working chamber 13. As a result, the fluid transfer channel 15 and the valve assembly 3 provide a secondary fluid flow path that can communicate fluid between the first and second working chambers 12, 13.

In the illustrated examples, the reservoir valve 39 is an electro-mechanical valve that is mounted externally on the reserve tube 14. As shown in FIGS. 2, 4-6, and 8, the valve connection point 34 on the fluid transfer tube 2 may include a localized flattened area that is positioned between the piston end 24 and the valve end 26 of the fluid transfer tube 2 in order to provide a suitable surface for the connection of the reservoir valve 39 to the fluid transfer tube 2. During operation of the shock absorber 10, the reservoir valve 39 variably controls the flow of damping fluid between the first working chamber 12 and reservoir chamber 16 and the base valve 36 variably controls the flow of damping fluid between the reservoir chamber 16 and the second working chamber 13. It should be appreciated that the reservoir valve 39 can be any suitable electro-mechanical valve. Examples of suitable reservoir valves 39 are described in U.S. Pat. Nos. 5,924,528, 6,321,888 and 7,252,181, the contents of which are hereby incorporated herein by reference.

In the illustrated embodiments, the pressure tube 1 and the fluid transfer tube 2 are centrally positioned in the reserve tube 14. In other words, the pressure tube 1, the fluid transfer tube 2, and the reserve tube 14 are substantially concentrically (i.e., co-axially) oriented around the longitudinal axis 38. However, it should be appreciated that other orientations are possible where one or more of the pressure tube 1, the fluid transfer tube 2, and the reserve tube 14 are off-set (i.e., off-center) with respect to the longitudinal axis 38. The pressure tube 1, the fluid transfer tube 2, and the reserve tube 14 have been illustrated as tubular members that are generally cylindrical in shape. However, it should be appreciated that other shapes are possible where the pressure tube 1, the fluid transfer tube 2, and/or the reserve tube 14 have non-circular cross-sectional shapes.

The shock absorber 10 illustrated in FIGS. 1-10 includes an insert 6, positioned in the intermediate chamber 30, that reduces the volume of damping fluid in the intermediate chamber 30. The insert 6 is a tubular member that is positioned between pressure tube 1 and fluid transfer tube 2 in the intermediate chamber 30. The shape of the insert 6 defines the fluid transfer channel 15 that extends longitudinally through the intermediate chamber 30. In the illustrated examples, the insert 6 is positioned concentrically with the pressure tube 1 and the fluid transfer tube 2 about the longitudinal axis 38. The insert 6 extends longitudinally in the intermediate chamber 30 between an outlet end 42 and a terminating end 44 and includes an inner surface 45 and an outer surface 47. The inner surface 45 of the insert 6 faces the external surface 27 of the pressure tube 1 and the outer surface 47 of the insert 6 faces the inside surface 29 of the fluid transfer tube 2. The insert 6 has an axial length L1 that is shorter than an axial length L2 of fluid transfer tube 2. The outlet end 42 of the insert 6 is positioned short of the one or more outlets 32 so as not to impede the flow of damping fluid from the first working chamber 12 into the fluid transfer channel 15. The terminating end 44 of the insert 6 is positioned near the valve connection point 34 of the fluid transfer tube 2.

As shown in FIGS. 4 and 8-10, the insert 6 is shaped as a split tube and includes a separation 40 between a first longitudinal edge 46 and a second longitudinal edge 48. The separation 40 between the first longitudinal edge 46 and the second longitudinal edge 48 at least partially defines the fluid transfer channel 15 that extends linearly between the outlet 32 and the valve connection point 34. The separation 40 between the first longitudinal edge 46 and the second longitudinal edge 48 is oriented such that insert 6 does not obscure the valve connection point 34.

The insert 6 has a thickness T and is configured such that the separation 40 between first longitudinal edge 46 and second longitudinal edge 48 has a limited circumferential extent W of less than 180 degrees. These characteristics of insert 6 can be varied to change the damping properties of shock absorber 10. For example, the circumferential extent W of the fluid transfer channel 15 and/or the thickness T and length L of the insert 6 can be varied to change the volume of the fluid transfer channel 15 and the volume of the intermediate chamber 30. The profile of the first longitudinal edge 46 and the second longitudinal edge 48 may also be varied as desired to provide further tuning of the damping properties of the shock absorber 10. In the examples illustrated, the thickness T of the insert 6 is selected such that the inner surface 45 of the insert 6 abuts the external surface 27 of the pressure tube 1 and the outer surface 47 of the insert 6 abuts the inside surface 29 of the fluid transfer tube 2. As a result, the fluid transfer channel 15 is bounded by surfaces of the pressure tube 1, the fluid transfer tube 2, the first longitudinal edge 46 of the insert 6, and the second longitudinal edge 48 of the insert 6.

The relative size of the outlet 32, valve connection point 34, and/or the circumferential extent W of the fluid transfer channel 15 is configured to provide substantially unrestricted flow from the outlet 32, through fluid transfer channel 15, to the valve connection point 34. However, it may be desirable to increase or decrease the circumferential extent W of the fluid transfer channel 15 to be larger than or smaller than the size of the outlet 32 and/or the valve connection point 34 in order to obtain desired damping characteristics of the shock absorber 10. Because these various characteristics of the insert 6 can be varied, the secondary fluid passageway between the first working chamber 12 and the second working chamber 13 created by the fluid transfer channel 15 can be tuned on a case-by-case basis to reduce or eliminate the creation, propagation, and resonance of pressure waves inside the intermediate chamber 30 during rapid acceleration of the piston 4 in the inner volume 11 of the pressure tube 1. As a result, the shock absorber 10 will produce less chatter and other objectionable noises during operation.

Figure 11:
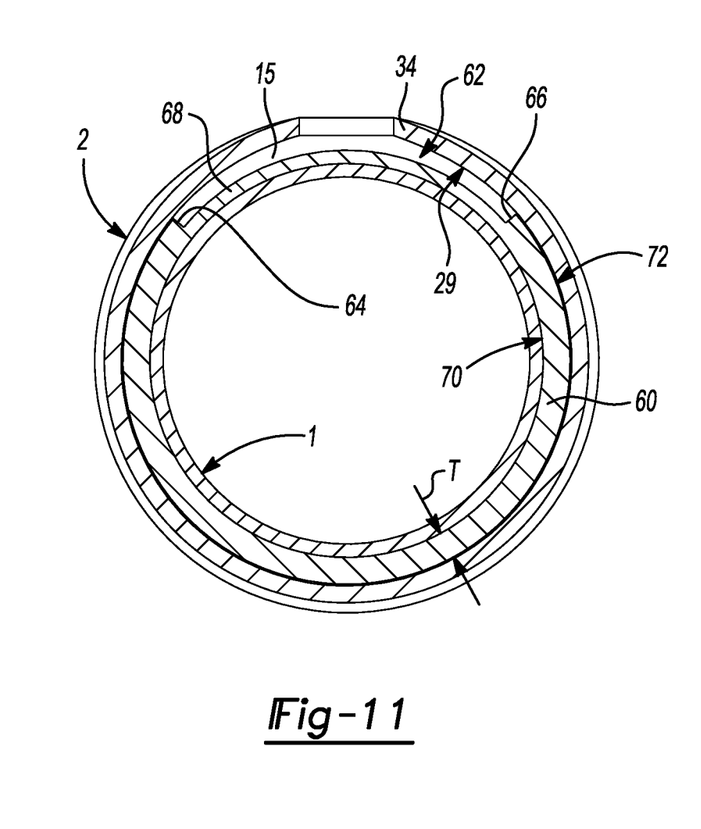
FIG. 11 is a cross-sectional end view of another exemplary assembly constructed in accordance with the present disclosure showing another exemplary insert.

Another exemplary insert 60 is shown in FIG. 11, where the insert 60 includes a longitudinal groove 62 that defines the fluid transfer channel 15 instead of the separation 40 shown in FIGS. 4 and 8-10. In FIG. 11, the fluid transfer channel 15 is defined by surfaces of the insert 60 on three sides and by the inside surface 29 of the fluid transfer tube 2 on the fourth side. The insert 60 includes an inner surface 70 that faces the pressure tube 1 and an outer surface 72 that faces the fluid transfer tube 2. In this example, the longitudinal groove 62 extends axially along the outer surface 72 for the entire length of the insert 60. The insert 60 is a tubular member that is similarly positioned as described with respect to insert 6. The longitudinal groove 62 is inset and radially extends only through a portion of the thickness T of insert 60. In other words, the thickness T of the insert 60 is reduced in the area of the longitudinal groove 62. The fluid transfer channel 15 formed by the longitudinal groove 62 is bounded by a first shoulder 64 of the insert 60, a second shoulder 66 of the insert 60, and groove base 68. It should be appreciated, that the size of the longitudinal groove 62 can be varied or multiple longitudinal grooves can be included in the insert 60 in order to obtain desired damping characteristics and performance of the shock absorber 10.

Insert 6 and insert 60 may be constructed of a variety of suitable materials such as plastics, steels, alloys, or composites in the examples shown. In other examples, insert 6 or insert 60 can be stamped or otherwise formed into the desired configuration. Any suitable structure or connection can be used to maintain the orientation of insert 6 or insert 60 between the pressure tube 1 and the fluid transfer tube 2 so that the position of the fluid transfer channel 15 is maintained in alignment with the outlet 32 and the valve connection point 34. In one example, insert 6 or insert 60 can be pinched or staked in position. In other examples, cooperating features on insert 6, insert 60, pressure tube 1, and/or fluid transfer tube 2 can be incorporated such as grooves, projections, channels or the like. Still further, insert 6 or insert 60 can be secured using suitable welding, adhesive, or other joining processes. Regardless of the method, insert 6 or insert 60 is prevented from rotating about the longitudinal axis 38 relative to the pressure tube 1 and the fluid transfer tube 2 in order to maintain an unrestricted flow path in the fluid transfer channel 15.

Figure 12:
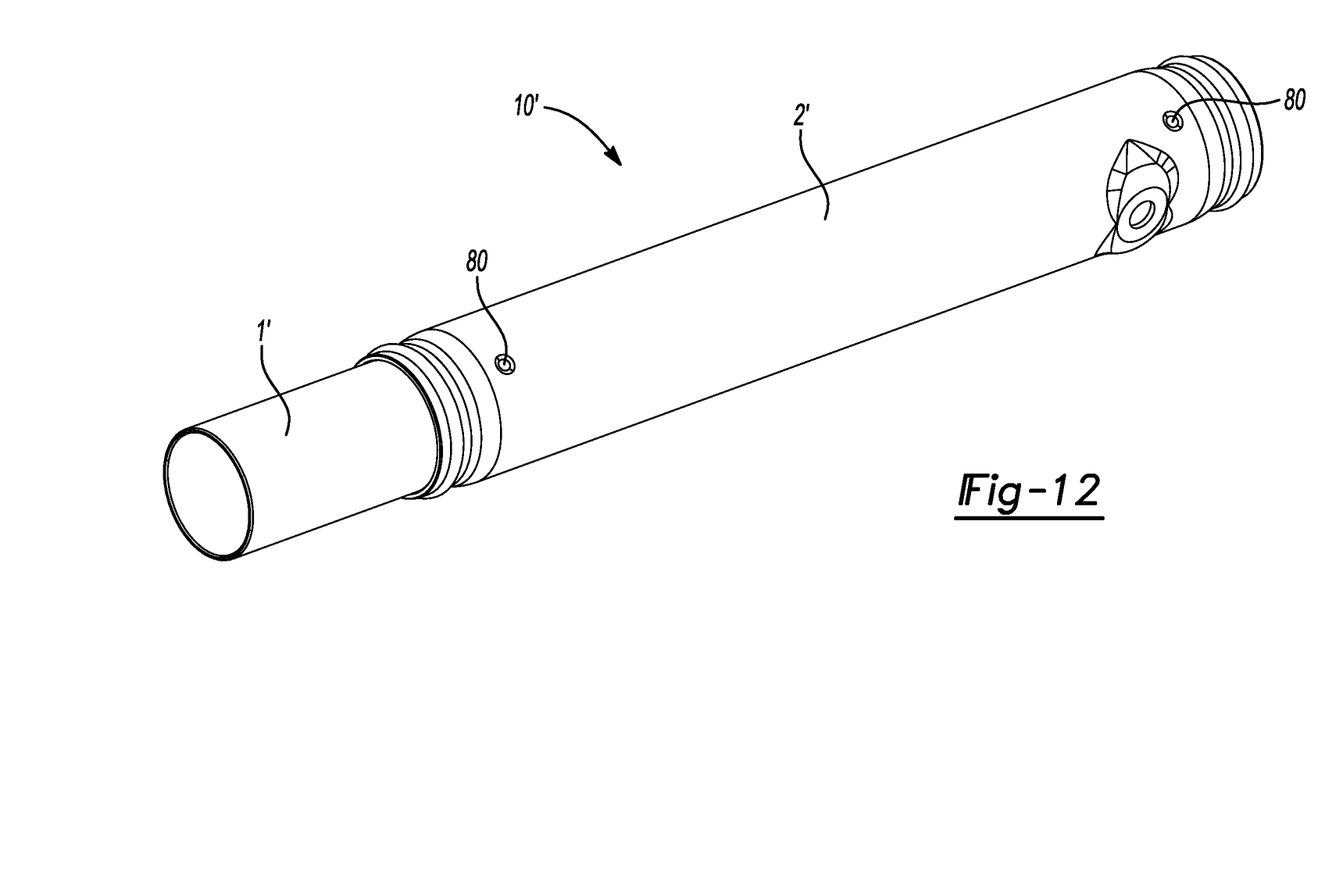
FIG. 12 is a perspective view of another exemplary pressure tube and fluid transfer tube assembly constructed in accordance with the present disclosure.
Figure 13:
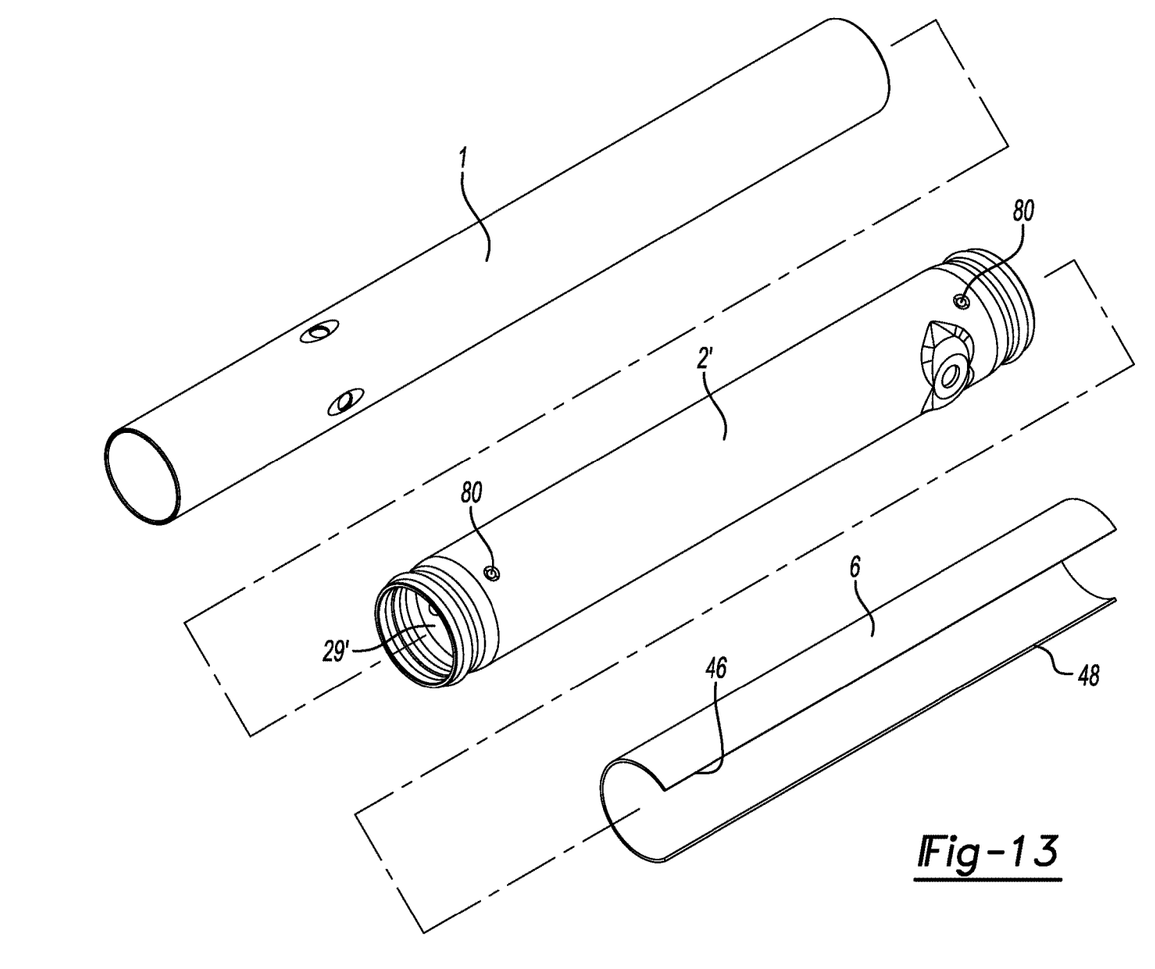
FIG. 13 is an exploded perspective view of the exemplary assembly shown in FIG. 12.
Figures 14, 15:
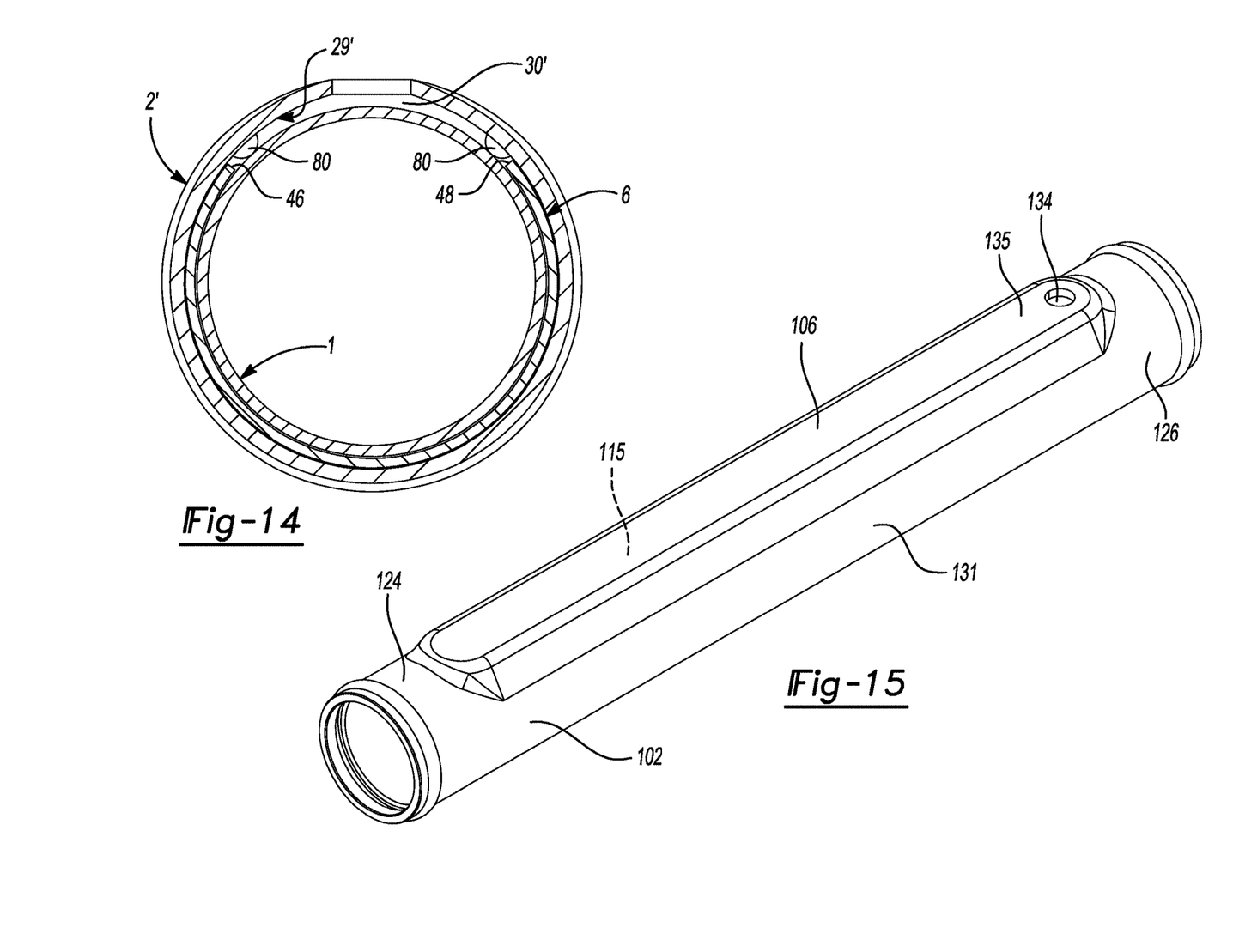
FIG. 14 is an end view of the exemplary assembly shown in FIG. 12.
FIG. 15 is a perspective of another exemplary fluid transfer tube constructed in accordance with the present disclosure.
Figure 16:
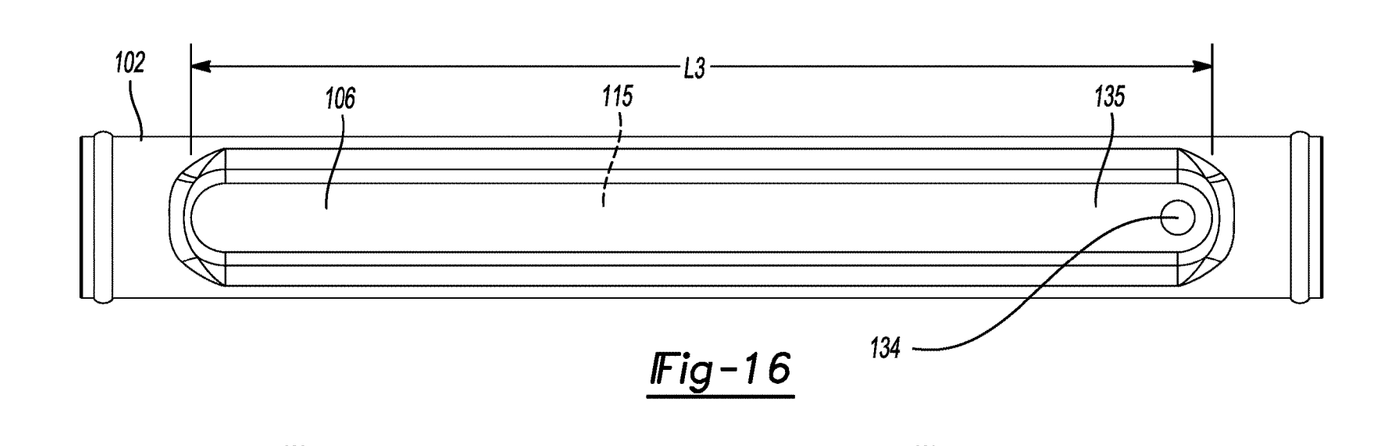
FIG. 16 is a top view of the exemplary fluid transfer tube shown in FIG. 15.
Figure 17:
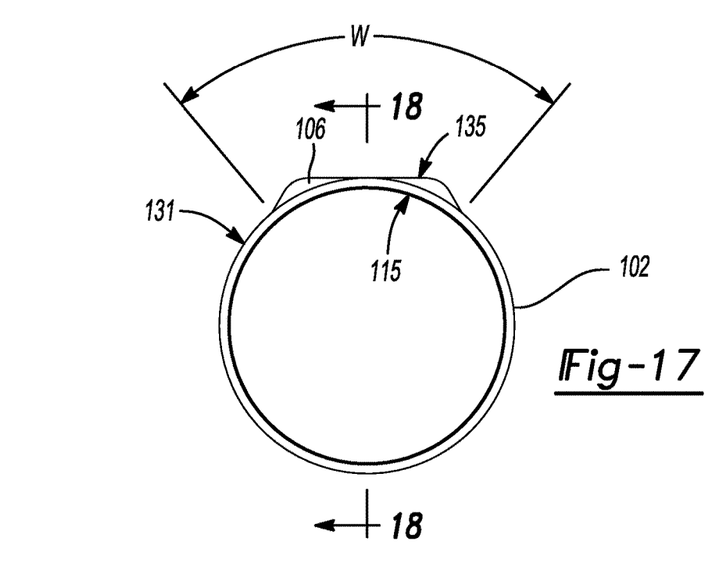
FIG. 17 is an end view of the exemplary fluid transfer tube shown in FIG. 15.
Figure 18:
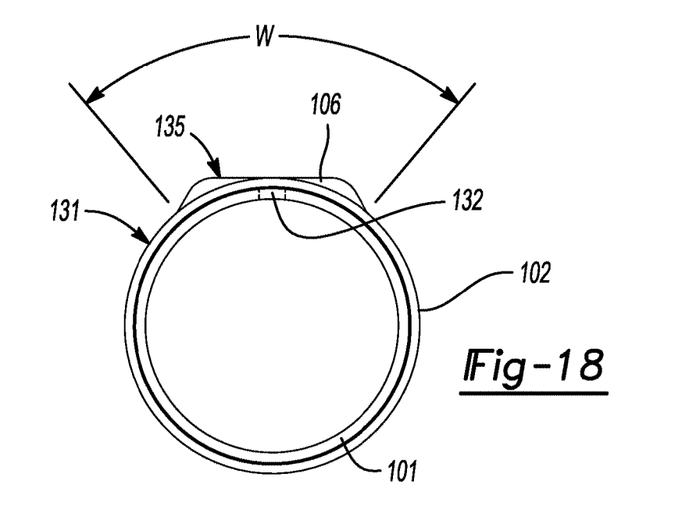
FIG. 18 is an end view of the exemplary fluid transfer tube shown in FIG. 15 assembled with an exemplary pressure tube.
Figure 19:
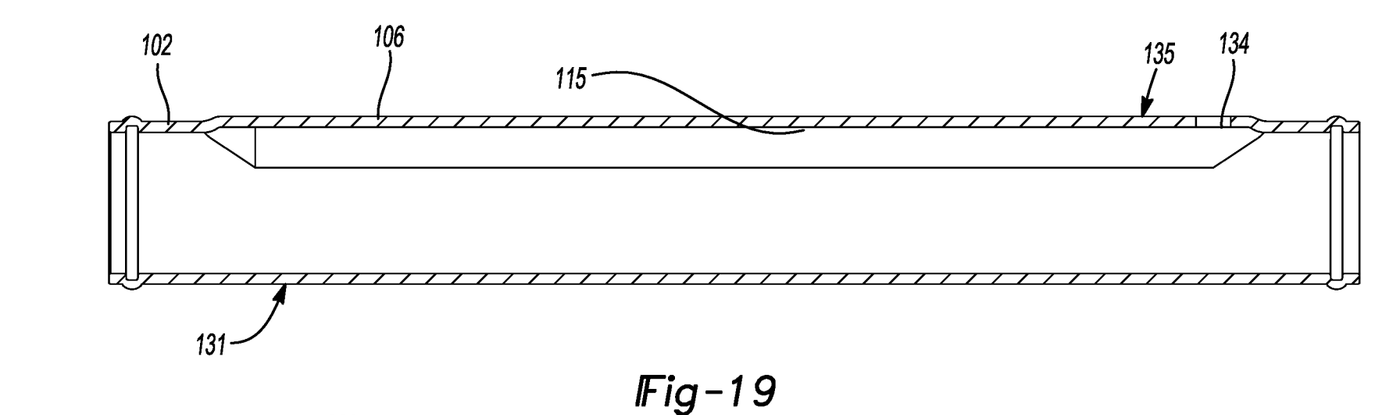
FIG. 19 is a cross-sectional side view of the exemplary fluid transfer tube shown in FIG. 15.

One such example is illustrated in FIGS. 12-14, the shock absorber 10' includes a fluid transfer tube 2' that is provided with one or more alignment projections 80. The alignment projections 80 extend inwardly from the inside surface 29' of the fluid transfer tube 2' into the intermediate chamber 30' towards the pressure tube 1. The alignment projections 80 are received between the first and second longitudinal edges 46, 48 of insert 6 or between the first and second shoulders 64, 66 of insert 60 to insure proper alignment of the respective inserts 6, 60 in the intermediate chamber 30' and to prevent rotation of the inserts 6, 60 relative to the fluid transfer tube 2'.

FIGS. 15-19 show another exemplary embodiment of a fluid transfer tube 102. In this example, the fluid transfer tube 102 includes a longitudinally extending pocket 106 that defines the fluid transfer channel 115. In this example, the fluid transfer tube 102 is positioned similarly to the fluid transfer tube 2 shown in FIGS. 1-10 and is located between a pressure tube 101 and a reserve tube (not shown). The fluid transfer tube 102 includes a piston end 124, a valve end 126, and a valve connection point 134 and is positioned to create a fluid transfer channel 115 to connect an outlet 132 of the pressure tube 101 to a valve connection point 134.

In this example, the fluid transfer channel 115 is defined by the longitudinally extending pocket 106 that is a formation in the fluid transfer tube 102 that creates a gap between the pressure tube 101 and the fluid transfer tube 102. The longitudinally extending pocket 106 is a raised formation that extends radially outward from an outside surface 131 of the fluid transfer tube 102. The longitudinally extending pocket 106 is raised, in this example, around only a circumferential portion of the outside surface 131 of the fluid transfer tube 2. That is, the longitudinally extending pocket 106 is raised only along a desired arc length of the circumference (i.e., a limited circumferential extent W) of the fluid transfer tube 2. The desired arc length, or circumferential width W, of the longitudinally extending pocket 106 can be varied in order to obtain a desired damping characteristic of the shock absorber 10.

The longitudinally extending pocket 106 also extends axially along the length of the fluid transfer tube 102. In this example, the longitudinally extending pocket 106 has an axial length L3 that is substantially the same length as the axial distance between the outlet 132 of the pressure tube 101 and the valve connection point 134. As can be appreciated, the axial length L3 of the longitudinally extending pocket 106 (as well as a depth of the longitudinally extending pocket 106) can also be varied as desired to obtain desired damping characteristics.

Figure 20:
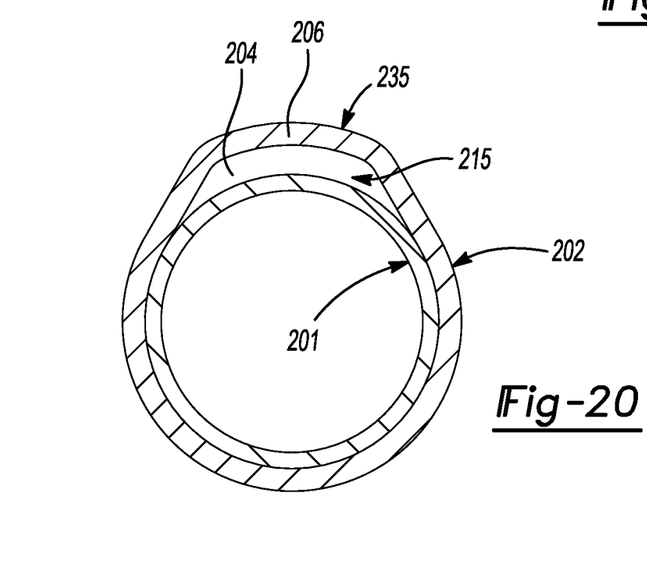
FIG. 20 is a cross-sectional end view of another exemplary fluid transfer tube and pressure tube assembly constructed in accordance with the present disclosure.

The longitudinally extending pocket 106 has a top wall 135 that is substantially planar in this example. The reservoir valve 39 can be easily connected to the top wall 135. In other examples, however, different profiles of the top wall 135 of the track may be used. In FIG. 20, another exemplary fluid transfer tube 202 is shown with a longitudinally extending pocket 206 that has a rounded or arcuate top wall 235. The longitudinally extending pocket 206 is raised above pressure tube 201 to create a gap 204 between the longitudinally extending pocket 206 and the pressure tube 201. This gap 204 defines fluid transfer channel 215.

Figure 21:
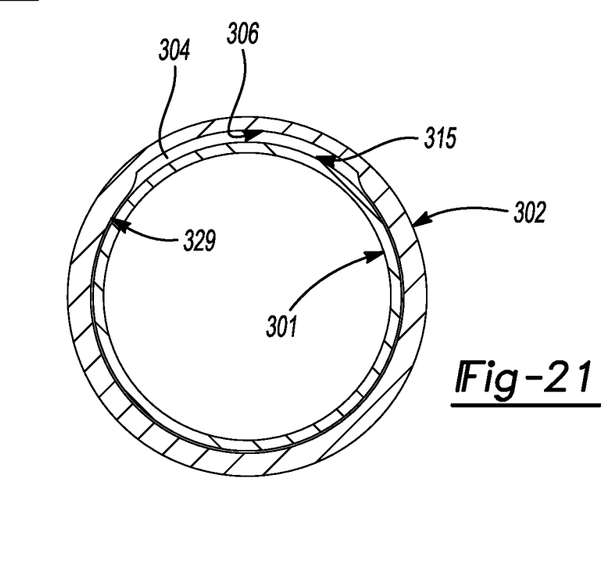
FIG. 21 is a cross-sectional end view of another exemplary fluid transfer tube and pressure tube assembly constructed in accordance with the present disclosure.

FIG. 21 shows yet another exemplary fluid transfer tube 302. In this example, a longitudinal groove 306 is provided along inside surface 329 of the fluid transfer tube 302. In this example, material is removed or a channel/pocket is formed into the inside surface 329 of the fluid transfer tube 302 to create a gap 304 between the fluid transfer tube 302 and pressure tube 301. This gap 304 defines fluid transfer channel 315. The longitudinal groove 306, in this example, creates a thinner-walled portion of the fluid transfer tube 302 that is located along a circumferential portion of the fluid transfer tube 302.

As previously described, the fluid transfer tubes 102, 202, 302 include only one fluid transfer channel 115, 215, 315. In other examples, the fluid transfer tube can include two or more fluid transfer channels to vary the volume of the intermediate chamber 30. Such modification may be desirable to obtain desired damping characteristics of the shock absorber 10.

The foregoing example embodiments and variations of the example embodiments can be used to obtain shock absorbers and hydraulic damping systems that provide improvements over existing technology. Existing technology can cause chatter or other objectionable noises when in use. The foregoing examples resolve this issue and provide a variety of ways to balance the sound quality and ride comfort of a vehicle. Variations to the specific example embodiments can be made in order to tune and optimize both sound quality and ride comfort when used in connection with a suspension system on a vehicle.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A shock absorber comprising:
a pressure tube extending about a longitudinal axis and defining an inner volume;
a piston assembly attached to a piston rod and slidably disposed within the pressure tube, the piston assembly dividing the inner volume of the pressure tube into a first working chamber and a second working chamber;
a bi-directional primary fluid flow path extending through the piston to fluidly interconnect the first working chamber and the second working chamber;
a fluid transfer tube extending about the pressure tube such that an intermediate chamber is defined between the pressure tube and the fluid transfer tube, the intermediate chamber disposed in fluid communication with the first working chamber;
a valve assembly disposed in fluid communication with and controlling fluid flow between the intermediate chamber and the second working chamber, wherein at least part of the intermediate chamber is formed by a fluid transfer channel that extends longitudinally within the fluid transfer tube to provide a secondary fluid flow path extending between the first working chamber and the valve assembly, wherein the primary fluid flow path extends in parallel with the secondary fluid flow path;
a reserve tube extending about the fluid transfer tube such that a reservoir chamber is defined between the fluid transfer tube and the reserve tube, wherein the pressure tube includes at least one outlet providing fluid communication between the first working chamber and the intermediate chamber, and wherein the valve assembly includes a reservoir valve disposed in fluid communication between the intermediate chamber and the reservoir chamber and a base valve disposed in fluid communication between the reservoir chamber and the second working chamber, the reservoir valve being positioned outside of the fluid transfer tube; and
an insert positioned in the intermediate chamber that reduces the volume of the intermediate chamber and defines the fluid transfer channel,
wherein the insert is shaped as a fixed, rigid split tube having first and second longitudinal edges that are spaced apart by a separation, the fluid transfer channel formed by the separation in the insert.

2. The shock absorber of claim 1, wherein the fluid transfer tube includes at least one alignment projection that extends inwardly into said intermediate chamber and is received in the fluid transfer channel defined by the insert to insure proper alignment of the insert in the intermediate chamber and to prevent rotation of the insert relative to the fluid transfer tube.

3. The shock absorber of claim 1, wherein the insert includes an inner surface facing the pressure tube, an outer surface facing the fluid transfer tube, and an insert wall thickness, the outer surface of the insert including a longitudinal groove where the insert wall thickness is reduced relative to an adjacent portion of the insert, the fluid transfer channel defined by the longitudinal groove in the insert.

4. The shock absorber of claim 1, wherein the fluid transfer tube includes an inside surface facing the pressure tube, an outside surface, and a longitudinally extending pocket that protrudes from the outside surface of the fluid transfer tube, the fluid transfer channel extending within the longitudinally extending pocket of the fluid transfer tube.

5. The shock absorber of claim 1, wherein the fluid transfer tube includes an inside surface facing the pressure tube, an outside surface, and a transfer tube wall thickness, the inside surface of the fluid transfer tube including a longitudinally extending groove where the transfer tube wall thickness is reduced relative to an adjacent portion of the transfer tube, wherein the fluid transfer channel is formed by the longitudinally extending groove in the fluid transfer tube.

6. The shock absorber of claim 1, wherein the fluid transfer channel runs parallel to the longitudinal axis and has a limited circumferential extent of less than 180 degrees.

7. The shock absorber of claim 1, wherein the insert defines only one fluid transfer channel in the intermediate chamber.

8. A shock absorber comprising:
a pressure tube extending about a longitudinal axis and defining an inner volume;
a piston assembly attached to a piston rod and slidably disposed within the pressure tube, the piston assembly dividing the inner volume of the pressure tube into a first working chamber and a second working chamber;
a bi-directional valve positioned within the piston assembly to control fluid flow from the first working chamber to the second working chamber as well as from the second working chamber to the first working chamber;
a fluid transfer tube extending about the pressure tube such that an intermediate chamber is defined between the pressure tube and the fluid transfer tube, the intermediate chamber disposed in fluid communication with the first working chamber; the fluid transfer tube including a port radially extending through a wall of the fluid transfer tube to interconnect the intermediate chamber and the reservoir chamber;
a reserve tube extending about the fluid transfer tube such that a reservoir chamber is defined between the fluid transfer tube and the reserve tube;
a base valve disposed in fluid communication with and controlling fluid flow between the reservoir chamber and the second working chamber,
wherein at least part of the intermediate chamber is formed by a fluid transfer channel that extends longitudinally within the fluid transfer tube to provide a fluid flow path extending between the first working chamber and the reservoir chamber that bypasses the base valve and the second working chamber; and
an insert positioned in the intermediate chamber that is shaped as a fixed, rigid split tube, the insert including an inner surface abutting the pressure tube, an outer surface abutting the fluid transfer tube, and first and second longitudinal edges that are spaced apart by a separation, wherein the fluid transfer channel is formed by the separation in the insert.

9. The shock absorber of claim 8, wherein the fluid transfer tube includes an inside surface abutting the pressure tube, an outside surface, and a longitudinally extending pocket that protrudes from the outside surface of the fluid transfer tube, the fluid transfer channel extending within the longitudinally extending pocket of the fluid transfer tube.

10. The shock absorber of claim 8, wherein the fluid transfer tube includes a flattened area on an outer surface circumscribing the port.

* * * * *